(12) United States Patent
Zhou

(10) Patent No.: US 6,950,879 B2
(45) Date of Patent: Sep. 27, 2005

(54) USING VIRTUAL NETWORK ADDRESS INFORMATION DURING COMMUNICATIONS

(75) Inventor: Qiaofeng Zhou, Sammamish, WA (US)

(73) Assignee: Interland, Inc., Atlanta, GA (US)

( * ) Notice: Subject to any disclaimer, the term of this patent is extended or adjusted under 35 U.S.C. 154(b) by 772 days.

(21) Appl. No.: 09/768,671

(22) Filed: Jan. 24, 2001

(65) Prior Publication Data

US 2002/0138578 A1 Sep. 26, 2002

(51) Int. Cl.[7] .................. G06F 15/16; G06F 15/173; H04B 7/212; G08B 29/00
(52) U.S. Cl. .................. 709/245; 709/223; 709/202; 370/348; 340/506
(58) Field of Search .................. 709/245, 223, 709/202, 206; 370/348; 340/506

(56) References Cited

U.S. PATENT DOCUMENTS

| 4,745,599 | A | * | 5/1988 | Raychaudhuri ............. 370/348 |
| 5,889,954 | A | * | 3/1999 | Gessel et al. ............... 709/223 |
| 6,415,329 | B1 | * | 7/2002 | Gelman et al. ............. 709/245 |
| 6,658,454 | B1 | * | 12/2003 | Delany et al. .............. 709/202 |
| 6,717,513 | B1 | * | 4/2004 | Sandelman et al. ......... 340/506 |

OTHER PUBLICATIONS

McKusick, Marshall Kirk, Keith Bostic, Michael J. Karels and John S. Quarterman, "The Design and Implementation of the 4.4BSD Operating System", Addison–Welsey Longman, Inc., Canada, 1996, Chapter 11, "Interprocess Communication," pp. 361–393; Chapter 12, "Network Communication," pp. 395–434; Chapter 13, "Network Protocols," pp. 435–487.

* cited by examiner

Primary Examiner—John Follansbee
Assistant Examiner—Philip Lee
(74) Attorney, Agent, or Firm—Thomas, Kayden, Horstemeyer & Risley LLP

(57) ABSTRACT

Techniques are described for employing virtual network address information in communications with other computing devices or software programs. In some circumstances, the techniques are used by a computing device that hosts multiple virtual domains each having a distinct domain name and having one or more virtual users of the domain. If so, the host computing device communicates with others on behalf of the virtual domains or virtual users by employing virtual network address information as part of the communications.

41 Claims, 10 Drawing Sheets

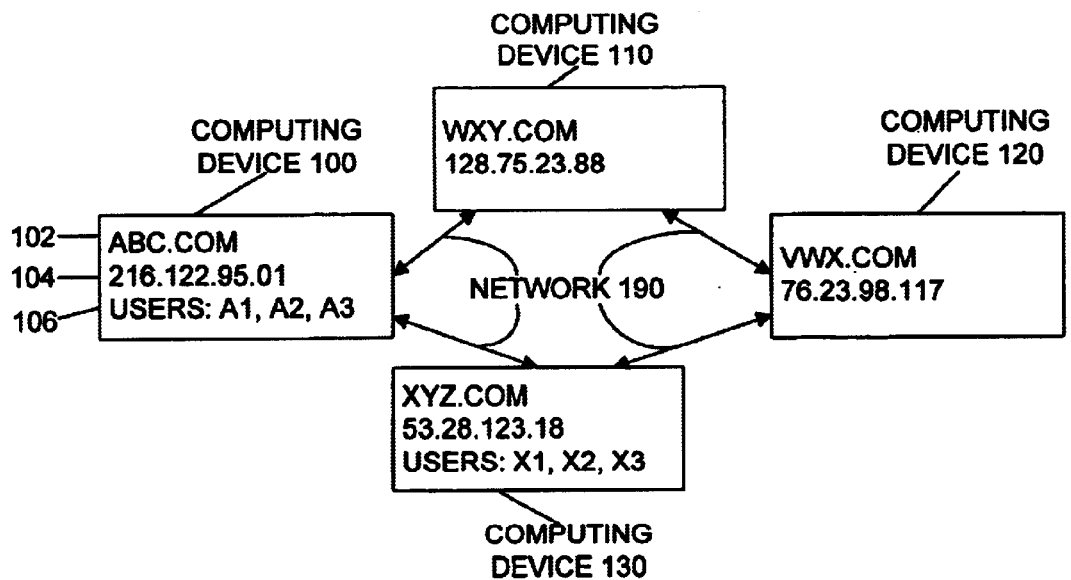

FIG. 1A (PRIOR ART)

Example message generated by User A1's local mail program

Date: Mon, 27 Nov 00 10:18:52
From: "Alan Smith" <a1@abc.com>
To: x1@xyz.com, a2
Subject: Test Message This message is a test. The end.

FIG. 1B (PRIOR ART)

Example message as modified by local computing device 100 Sendmail program

From a1@abc.comMon Nov 27 10:19:23 2000
Message-Id: <9631121611.AA02124@abc.com>
Date: Mon, 27 Nov 00 10:18:52
From: "Alan Smith" <a1@abc.com>
To: x1@xyz.com, a2
Subject: Test Message This message is a test. The end.

FIG. 1C (PRIOR ART)

Example message as modified by remote computing device 130 Sendmail program

```
From a1@abc.com Mon Nov 27  10:19:23    2000
Received:   From abc.com [216.122.95.01] by xyz.com (8.8.4/8.8.4)
            with ESMTP id BF02C24; Mon, 27 Nov 2000  10:21:46
Message-Id: <9631121611.AA02124@abc.com>
Date:       Mon, 27 Nov 00  10:18:52
From:       "Alan Smith" <a1@abc.com>
To:         x1@xyz.com, a2
Subject:    Test Message
```

This message is a test. The end.

FIG. 1D (PRIOR ART)

Example SMTP exchange as computer device 100 Sendmail Connects to computing device 130 Sendmail

```
220-xyz.com Sendmail 8.6.12/8.5 ready at Mon, 27 Nov 2000 10:22:23 –8—
220 ESMTP spoken here
>>>EHLO abc.com
250-xyz.com Hello abc.com, pleased to meet you
250 –EXPN
250-SIZE
250 HELP
>>>MAIL From:<a1@abc.com>
250 <a1@abc.com>... Sender ok
>>>RCPT To:<x1@xyz.com>
250 <x1@xyz.com> ... Recipient ok
>>>DATA
354 Enter mail, end with "." on a line by itself
{The message illustrated in Figure 1C is transmitted}
>>>.
250 GAA20115 Message accepted for delivery
x1@xyz.com ... Sent (GAA20115 Message accepted for delivery)
Closing connection to xyz.com
>>>QUIT
221 xyz.com closing connection
```

FIG. 1E (PRIOR ART)

Example message generated by User B1's local mail program

Date: Mon, 27 Nov 00 10:18:52
From: "Bob Smith" <b1@bcd.com>
To: x1@xyz.com, b2
Subject: Test Message 2

This message is a test. The end.

Example message as modified by virtual computing device 200 Sendmail program

From <u>b1@bcd.com</u>     Mon Nov 27  10:19:23   2000
Message-Id: <3431121623.4B0213D@bcd.com>
Date:       Mon, 27 Nov 00  10:18:52
From:      "Bob Smith" <<u>b1@bcd.com</u>>
To:         <u>x1@xyz.com</u>, b2
Subject:   Test Message 2

This message is a test. The end.

FIG. 2C

Example message as modified by remote computing device 130 Sendmail program

From a1@abc.comMon Nov 27  10:19:23   2000
Received:   from abc.com [216.122.95.01] by xyz.com (8.8.4/8.8.4)
            with ESMTP id CD0A224; Mon, 27 Nov 2000  10:21:46
Message-Id: <3431121623.4B0213D@bcd.com>
Date:       Mon, 27 Nov 00  10:18:52
From:      "Bob Smith" <<u>b1@bcd.com</u>>
To:         <u>x1@xyz.com</u>, b2
Subject:   Test Message 2

This message is a test. The end.

FIG. 2D

Example SMTP exchange as virtual computing device 200 Sendmail
connects to computing device 130 Sendmail 220-xyz.com Sendmail 8.6.12/8.5 ready at Mon, 27 Nov 2000 10:22:23 − 0800
220 ESMTP spoken here
>>>EHLO bcd.com
250-xyz.com Hello bcd.com (abc.com), pleased to meet you
250-EXPN
250-SIZE
250 HELP
>>>MAIL From:<b1@bcd.com>
250 <b1@bcd.com> ... Sender ok
>>>RCPT To:<x1@xyz.com>
250 <x1@zxyz.com> ... Recipient ok
>>>DATA
354 Enter mail, end with "." on a line by itself
    {The message illustrated in Figure 2C is transmitted}
>>>.
250 GAA20115 Message accepted for delivery
x1@xyz.com ... Sent (GAA20115 Message accepted for delivery)
Closing connection to xyz.com
>>>QUIT
221 xzy.com closing connection Error file
Host abc.com claimed to be bcd.com

FIG. 2E

Example message as modified by remote computing device 130 Sendmail
program
when sent by Virtual Domain Sendmail program on computing device 100

From b1@bcd.com    Mon Nov 27 10:19:23  2000
Received:  from bcd.com [216.122.95.70] by xyz.com (8.8.4/8.8.4)
       with ESMTP id CD0A224; Mon, 27 Nov 2000  10:21:46
Message-Id: <3431121623.4B0213D@bcd.com>
Date:    Mon, 27 Nov 00 10:18:52
From:    "Bob Smith" <b1@bcd.com>
To:      x1@xyz.com., b2
Subject:  Test Message 2

This message is a test. The end.

FIG. 3A

Example SMTP exchange as Virtual Domain Sendmail program on computing device 100 connects to computing device 130

220-xyz.com Sendmail 8.6.12/8.5 ready at Mon, 27 Nov 2000
          10:22:23 – 0800
220 ESMTP spoken here
>>>EHLO bcd.com
250-xyz.com Hello bcd.com, pleased to meet you
250-EXPN
250-SIZE
250 HELP
>>>MAIL From:<b1@bcd.com>
250 <b1@bcd.com>...Sender ok
>>>RCPT To:x1@xyz.com
250 <x1@xyz.com>...Recipient ok
>>>DATA
354 Enter mail, end with "." on a line by itself
{*The message illustrated in Figure 2C is transmitted*}
· >>>.
250 GAA20115 Message accepted for delivery
x1@xyz.com... Sent (GAA20115 Message accepted for delivery)
Closing connection to xyz.com
>>>QUIT
221 xyz.com closing connection

FIG. 3B

USING VIRTUAL NETWORK ADDRESS INFORMATION DURING COMMUNICATIONS

TECHNICAL FIELD

The following disclosure relates generally to inter-computer communication, and more particularly to communication by a computer that hosts virtual domains or virtual users.

BACKGROUND

Computers communicate with each other for a variety of reasons. For example, a user on one computer may wish to send a message (e.g., an email) to a user on a remote computer or to retrieve a Web page from a remote computer. A client computer system can identify and communicate with millions of other computer systems on the Internet by using a unique network address for each such computer. A common type of network address is a unique numeric identifier called an "IP address" (e.g., 198.81.209.25). Each computer also typically has a unique textual Domain Name System (DNS) domain name network address (e.g., "micron.com" or "comp23.MicronPC.com") that is mapped to that IP address.

When a communication is sent from a client (or "source") computer system to a server (or "destination") computer system, the client computer system typically specifies the IP address of the server computer system (either directly or via a domain name that maps to the IP address) in order to facilitate the routing of the communication to the server computer system. Such communications typically take place using the TCP/IP network communications protocol. For example, common application-level communications protocols such as HTTP, FTP, Telnet, and Simple Mail Transfer Protocol (SMTP) typically use TCP/IP as an underlying communications mechanism. The TCP/IP protocol is described in greater detail in "TCP/IP Network Administration, Second Edition" by Craig Hunt, 1992, O'Reilly & Associates Publishing, which is hereby incorporated by reference in its entirety.

Application programs executing on different computers often communicate by using communication mechanisms provided by the operating systems on their computers. For example, application programs commonly exchange information using TCP/IP communication sockets that are provided by operating systems such as Unix or Microsoft Windows. A socket connection can be described with four pieces of information, those being a source computer IP address and software port and a destination computer IP address and software port. Such a socket connection is typically initiated by an application program executing on a server computer. In particular, a server application creates a socket on the server (e.g., via the "socket" function), binds the server computer IP address and the software port to the socket (e.g., via the "bind" function), and obtains a software port on the server which is mapped to the server application by the server's operating system. The server application then listens for a connection request from a client computer (e.g., via the "listen" function) that includes a source IP address and software port to which the server application can respond.

When a client application program wants to communicate with such a server application, the client application creates a socket on the client (via the "socket" function) and may determine a client computer software port that is to be mapped to the client application. The client application then specifies that the created socket has a destination IP address corresponding to the destination computer and a destination software port that corresponds to the port mapped to the server application program, and uses the socket to make a connection request to the server application (e.g., via the "connect" function). In particular, the connection request is transmitted to the destination IP address and software port, along with the source IP address and software port to allow the server to respond. The inclusion of the source IP address with the connection request can be performed by the client computer operating system, which determines the IP address for the computer on which the client application is executing (e.g., by using the routing table or some other mechanism on the client computer).

The connection request that is sent to the destination IP address and software port is routed to the executing server application, and the application program on the server computer can then accept the connection request (e.g., via the "accept" function) and use the included source IP address and software port to respond to the client application. After the connection is accepted, the two programs can establish a shared communications standard and exchange information. TCP/IP sockets are described in greater detail in "Pocket Guide to TCP/IP Sockets (C Version)" by Kenneth L. Calvert and Michael J. Donaho, 2000, Morgan Kaufmann Publishers, which is hereby incorporated by reference in its entirety.

The Sendmail mail transport agent program is one example of software that communicates in the manner described above. For example, consider a situation in which a user on a client computer creates an email message using a mail user agent program (e.g., elm or Zmail) and specifies that a user on a remote server computer is to be a recipient of the email. The client mail user agent program begins the transfer of the created email to the remote recipient by forwarding the email to a local mail transport agent program (e.g., Sendmail or Zmailer) that is executing on the client computer. A copy of the mail transport agent may already be executing, or the mail user agent may instead invoke the mail transport agent. It is the responsibility of the local mail transport agent to transfer the created email to the remote server computer. If the local mail transport agent is the Sendmail program, it next establishes a socket-based connection with a Sendmail mail transport agent program that is executing on the remote server computer, and sends the email to the server. In some situations, the Sendmail mail transport agent on the client computer will temporarily store the email in an outgoing email queue on the client computer before transferring the email to the server computer. After the mail transport agent on the server computer receives the email, it makes the email available to the remote user recipient, who can use a mail user agent program on the server computer to read the email. The Sendmail program is available at the time of this writing at "http://www.sendmail.org/", and additional details about Sendmail are available in "sendmail, Second Edition" by Bryan Costales with Eric Allman, 1997, O'Reilly & Associates Publishing, which is hereby incorporated by reference in its entirety.

FIGS. 1A–1E provide an illustrative example of email communications using the Sendmail program. In particular, FIG. 1A illustrates four computing devices that are accessible to each other over a network 190, with each of the computing devices using the Sendmail program (not shown) as their mail transport agent. Each computing device has a distinct assigned IP address 104 and a distinct DNS domain name 102 that is mapped to the assigned IP address. Each of the computing devices also have various users that have access to the computing device (e.g., by having user accounts on the device), with computing devices 100 and 130 each illustrating a list of defined users 106. In the illustrated embodiment, user a1 on computing device 100 will send an email to remote user x1 on computing device 130.

FIG. 1B illustrates an example email that is generated by user a1 using a local mail user agent program on computing device 100. Each email consists of a header portion 140 and a body portion 150, with the header portion including various information about the email and the body portion including the contents of the email. The illustrated email header currently includes 4 header lines 141–144 with header names "Date", "From", "To", and "Subject". Those skilled in the art will appreciate that a variety of other header lines can optionally be present.

FIG. 1C illustrates the same email after it is transferred to the local Sendmail program executing on computing device 100 for transmittal to computing device 130. As is illustrated, the local Sendmail program adds header lines 145 and 146 to the email message. Header line 145 indicates the sending user and the domain name of the sending computer, and header line 146 includes a unique message identifier for the email. In other situations, the local mail user agent may have already added these header lines when the email was generated, and if so the Sendmail program would not add them.

FIG. 1D illustrates the email as it is modified by the remote Sendmail program executing on computing device 130. In particular, when the remote Sendmail program receives the email, it adds a header line 147 to the email that indicates information about where the email was received from and when the email was received. In the illustrated embodiment, the header line 147 includes both the domain name (i.e., "abc.com") and IP address (i.e., "216.122.95.01") of the computing device from which the email was received.

FIG. 1E illustrates the communication that occurs between the two executing Sendmail programs when transferring the email. The two programs communicate using the SMTP communications protocol over TCP/IP sockets. In the illustrated embodiment, the communications from the local client Sendmail executing on computing device 100 are prefaced with ">>>" characters that are not actually transmitted but are shown here for the purposes of distinguishing these communications from those of the remote server Sendmail executing on the computing device 130. As shown in lines 161 and 162, the client Sendmail provides its domain name as part of the connection sequence, and the server Sendmail responds with a confirmation of the domain name identification.

Unfortunately, problems can arise when one computing device must communicate with other computing devices on behalf of a third-party. One reason that such problems can arise stems from the existence of malicious users that intentionally attempt to disguise the identity of themselves and their computing devices in a variety of ways, such as by having their computing devices transmit false domain name or IP address information for identification purposes (referred to as "IP spoofing"). In order to combat such malicious users, many computing devices and application programs have incorporated security measures to attempt to detect and/or prevent such malicious users and their computing devices from establishing connections. In particular, such security measures attempt to verify in various ways that the identification information provided by client computers is accurate. However, such security measures may also detect and/or prevent situations in which a computing device is legitimately acting on behalf of a third-party, such as when the computing device provides identification information that corresponds to the third-party.

As an example of a problem that arises when a computing device attempts to legitimately communicate with other computing devices on behalf of a third-party, consider the illustrative situation shown in FIG. 2A. In this situation, computing device 100 is acting as a shared host for four virtual computing devices ("VCDs") 200, 210, 220, and 230, also referred to as "virtual machines" or "virtual computers". Each VCD has distinct virtual network address information, including a distinct DNS domain name 202 and a distinct virtual IP address 204, as well as one or more defined virtual users 206. As with other domain names, the domain name of a VCD is mapped to the virtual IP address of that VCD (e.g., "bcd.com" is mapped to "216.122.95.70"). An owner of a computing device may allow it to act as a host for multiple VCDs or virtual IP addresses for a variety of reasons, such as if the hosting is a service that the owner provides to the domain name or VCD owners for a fee.

While the VCDs are not actual physical devices, they do share the resources of computing device 100 (e.g., memory, storage, and processing power) and can appear to their users as if they were physical devices. For example, user b1 of VCD 200 may be physically using the I/O devices of computing device 110, but may remotely login to VCD 200 (e.g., by using a Telnet program or Web browser) and gain access to the resources of VCD 200. Once access has been gained, user b1 can typically then perform the same types of actions as non-virtual users (e.g., user a1) of computing device 100, such as executing programs or modifying the contents of VCD 200's storage (e.g., storage of computing device 100 that is allocated to VCD 200). In addition to receiving access to computing device 100 resources, the virtual IP addresses of the VCDs are mapped to computing device 100 so that communications sent to those virtual IP addresses will be forwarded to the device in the same manner as communications sent to the device's actual IP address of "216.122.95.01".

As with non-virtual computing devices, the VCDs may need to communicate with other computing devices. For example, user b1 of VCD 200 may wish to send email to user x1 of computing device 130. In order to do so, however, the physical resources of computing device 100 will need to be used, with computing device 100 acting on behalf of VCD 200. Unfortunately, as indicated above, security measures employed by other computing devices or application program may detect and/or prevent such communication by computing device 100 despite the fact that it is acting legitimately on behalf of the third-party VCD 200.

FIGS. 2B–2E illustrate an example of virtual user b1 of VCD 200 sending email to user x1 of computing device 130 using the Sendmail program as the mail transport agent, and of problems caused by security measures employed by the Sendmail program (which is responsible in this example for the inter-computer communication). In particular, FIG. 2B illustrates an example email that is generated by user b1 using a local mail user agent program on VCD 200. This email is similar to that illustrated in FIG. 1B, with the exception that header line 242 identifies the sender as being a user of the "bcd.com" domain name for VCD 200 rather than the "abc.com" domain name for computing device 100. FIG. 2C illustrates the email after it is transferred to a local Sendmail program executing on VCD 200, such as by invoking the program. As with FIG. 1C, the local Sendmail program adds header lines 245 and 246 to the email message, but the header lines in this example also use the "bcd.com" domain name rather than computing device 100's "abc.com" domain name.

FIG. 2D illustrates the email as it is modified by the remote Sendmail program executing on computing device 130. In particular, the remote Sendmail program adds a header line 247 to the email that indicates information about where the sender of the email. However, as is illustrated in FIG. 2D (in bold for the sake of clarity), the remote server Sendmail identifies the domain name and IP address of the sending computing device to be that of the physical device used for the sending (i.e., "abc.com" and "216.122.95.01") rather than those of the VCD which was responsible for sending the email. The communication that occurs between the two executing Sendmail programs, shown in FIG. 2E, illustrates the same problem. In particular, as shown in line 261, the client Sendmail provides an indication that its domain name is "bcd.com". The server Sendmail believes the actual domain name of the client to be "abc.com", however, based on examining the IP address from which the communication request was made and mapping the IP address to its domain name. The server Sendmail indicates the inconsistency between the indicated domain name of the client and what it believes to be the true domain name in line 262 by including the true domain name in parentheses (illustrated in bold for the sake of clarity). The server Sendmail also adds an entry to an Error file indicating that the host "abc.com" claimed to be "bcd.com".

The misidentification of the email sender in the illustrated situation is caused by Sendmail's use of the standard socket network communications mechanism. In particular, even if the Sendmail program is invoked by another program executing in VCD 200 such as a mail user agent, the Sendmail program needs to have unrestricted access to various resources of computing device 100 and thus needs to execute with the highest level of system administrator privileges for computing device 100 (e.g., the "root" user for a Unix system). When the operating system of computing device 100 determines the network address information that corresponds to the socket created by the Sendmail program, it determines that the Sendmail program is executing for a user of computing device 100 having system administrator privileges and it retrieves the network address information for computing device 100. In this manner, the network address information of computing device 100 gets provided for the created socket rather than the network address information of VCD 200. Those skilled in the art will appreciate that a similar problem could occur for various other reasons in other situations. For example, if computing device 100 provided a single executing copy of a network communications program that processed the communications requests for all of the application programs running on the VCDs, that executing program may similarly use the network address information for computing device 100 rather than for any particular user or VCD executing an application program.

Unfortunately, the misidentification of the email sender in the illustrated situation can cause various problems. Depending on the configuration of the remote mail transport agent, such an email may not even be accepted. Moreover, even if the email is accepted and provided to user x1, the email will contain inconsistent information about the sender. In particular, header line 247 indicates that the email came from a user at a device with a domain name of "abc.com" and an IP address of 216.122.95.01, while header lines 242, 245 and 246 indicate that the email came from a user at a device with a domain name of "bcd.com" and an IP address of 216.122.95.70. Such inconsistent information can cause the recipient of the email to distrust the email or refuse to accept it. For situations in which a company is providing hosting services to customers, such problems can cause loss of business and other problems. Moreover, those skilled in the art will appreciate that these problems are not limited to email messages, and can instead occur for any type of inter-computer communication.

Thus, a need exists for a computing device that is acting legitimately on behalf of third-parties (e.g., a computing device acting as a host to VCDs or to virtual network addresses) to be able to communicate with other computing devices for those third-parties without triggering security measures employed by those other computing devices.

BRIEF DESCRIPTION OF THE DRAWINGS

FIGS. 1A and 2A are network diagrams illustrating interconnected network devices.

FIGS. 1B–1E and 2B–2E are examples of email messages communicated between network devices.

FIGS. 3A and 3B are examples of email messages communicated between network devices using techniques of the present invention.

DETAILED DESCRIPTION

A software facility is described below that employs virtual network address information in communications with other computing devices or software programs. In some embodiments, the facility is used by a computing device that hosts multiple virtual domains each having a distinct domain name and having one or more virtual users of the domain. In such embodiments, the host computing device communicates with others on behalf of the virtual domains or virtual users by employing virtual network address information as part of the communications.

For illustrative purposes, some embodiments of the software facility are described below in which email messages are exchanged using the Sendmail message transport agent program, and in which a computing device that host multiple virtual domains communicates with other computers on behalf of virtual users of those domains. However, those skilled in the art will appreciate that the techniques of the facility can be used in a wide variety of other situations, some of which are discussed below, and that the use of the facility is not limited to the exchange of email messages, to the use of the Sendmail program, or to situations in which a computing device is hosting virtual domains or virtual users.

Figure 4:
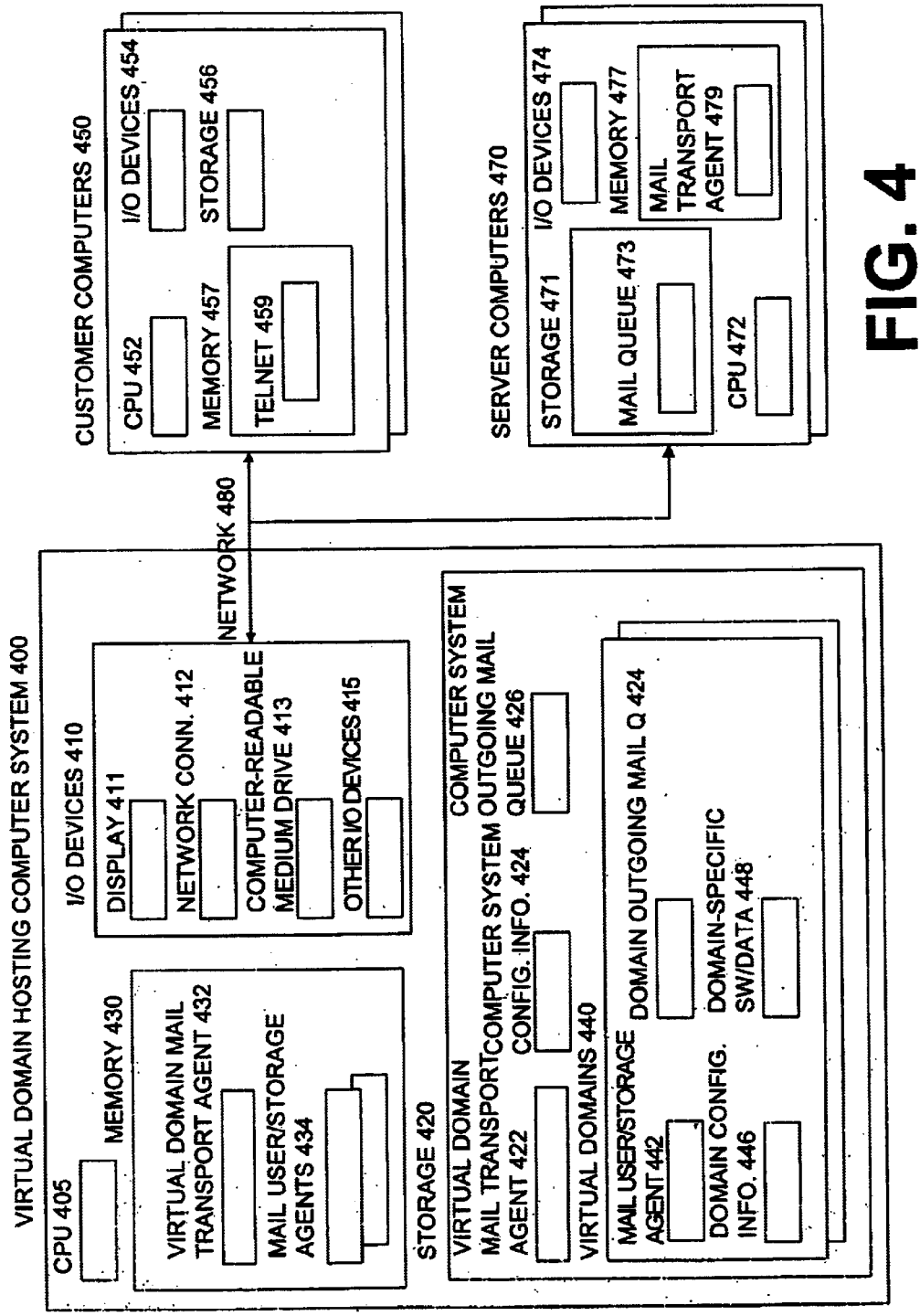
FIG. 4 is a block diagram illustrating an embodiment of the present invention.

In particular, FIG. 4 illustrates a virtual domain hosting computer system 400 suitable for executing the software facility, various customer computer systems 450 from which users can access the hosting computer system, and various other computer systems 470 that can communicate with the hosting computer system. The hosting computer system 400 includes a CPU 405, various I/O devices 410, storage 420 (e.g., a hard drive), and memory 430. The I/O devices include a display 411, a network connection 412, a computer-readable media drive 413, and other I/O devices 415.

The storage includes groups of information for multiple virtual domains 440 (or VCDs to which the virtual domains correspond) that are hosted by the hosting computer system. Each virtual domain can contain various information for use by users of the domain, such as a mail agent program 442 for creating and storing email messages and other domain-specific software and/or data 448. Each virtual domain also includes configuration information 446 for the domain (e.g., a virtual domain name for the domain, a virtual IP address to which the virtual domain name is mapped, a list of users of the virtual domain, etc.), and an outgoing mail queue in which mail created by users of the virtual domain for recipients at other computing devices is temporarily stored before transfer. In some embodiments, the mail agent program 442 will store the outgoing email in the virtual domain queue, while in other embodiments the mail agent program will transfer the email to a mail transport agent that will perform the storage. Those skilled in the art will appreciate that a variety of other data and software could similarly be stored for each virtual domain, and that one or more of the virtual domains may alternately lack some of the displayed information (e.g., there may be a single stored mail user agent that the users in all of the virtual domains use). Those skilled in the art will also appreciate that in some embodiments different virtual domains can use different mail agent programs 442.

In addition to the virtual domains, the storage also includes configuration information 424 for the computer system (e.g., information about the various virtual users and virtual domains, such as the locations in which the virtual domain information is stored) and an outgoing mail queue in which mail created by users of the computer system that are not users of any of the virtual domains is temporarily stored before transfer. The storage also includes a Virtual Domain Mail Transport Agent ("VDMTA") program 422 that, when executed, will transmit the email messages for the virtual domains to remote computer systems as appropriate. In some embodiments the VDMTA may be invoked by a mail agent 442 for a virtual domain when mail is available in the outgoing mail queue for the virtual domain, while in other embodiments the VDMTA periodically (e.g., every 30 minutes) checks the outgoing mail queues for the various virtual domains.

Executing copies of one or more mail user/storage agents 434 and one or more VDMTAs 432 are present in the memory. In some embodiments, a single copy of the VDMTA executes and transfers mail for all of the virtual domains, and in other embodiments multiple copies of the VDMTA can be executing for different virtual domains (e.g., when each virtual domain invokes a copy of the VDMTA when there is mail to be sent from the virtual domain's outgoing mail queue).

When processing the email for a virtual domain, an executing VDMTA retrieves the mail stored in the outgoing mail queue for the virtual domain and retrieves the virtual network address information for the virtual domain (e.g., from the stored domain configuration information for the virtual domain). For each email message in the queue, the VDMTA then determines any recipients on remote computing devices, establishes a connection with those remote computing devices on behalf of the virtual domain by using the retrieved virtual network address information, and then transmits the email to the remote computing devices. In particular, before establishing a connection with a remote computing device, the VDMTA binds the virtual network address information to the communication mechanism to be used in such a manner that the virtual network address information is used in place of that of the hosting computer system. For example, in the illustrated embodiment in which TCP/IP sockets are used, the virtual IP address for the virtual domain is bound to the socket before a connection request is sent to the remote computer.

If the hosting computer system has its own defined users that are not virtual users, such users may also create email messages for recipients of other computer systems. If so, they will use a mail transport agent (e.g., VDMTA) to send the email messages to those other computer systems using the network address information of the hosting computer system. In some circumstances, such as when the mail transport agent cannot immediately transmit an email message, a message will be stored in the outgoing mail queue 426 for the computer system. When a mail transport agent later retrieves the mail from the mail queue 426 for transmittal, the mail transport agent will send the email messages using the hosting computer system network address information.

The various virtual domain components and information on the hosting computer system may be accessed by users and software in a variety of ways. For example, some users may have physical access to the hosting computer system, and may thus be able to gain access via the I/O devices 410. Alternately, other users can use the I/O devices 454 and software (e.g., a Telnet program 459 executing in memory 457) that are provided by one of the consumer computer systems to remotely access a hosted virtual domain (e.g., via the Internet and/or the World Wide Web). In addition to user accesses of the virtual domain functionality, the hosting computer system can also exchange information (e.g., email messages) with various remote server computer systems 470, such as via mail transport agents 479 executing in memory 477 of the server computers.

Those skilled in the art will appreciate that computer systems 400, 450, and 470 are merely illustrative and are not intended to limit the scope of the present invention. Computer system 400 may be connected to other devices that are not illustrated, including through one or more networks such as the Internet or via the World Wide Web (WWW). In addition, the functionality provided by the illustrated components may in some embodiments be combined in fewer components or distributed in additional components. Similarly, in some embodiments the functionality of some of the illustrated components may not be provided and/or other additional functionality may be available. For example, other components could additionally be available to perform administrative functions for hosting customers (e.g., establishing new virtual domains and providing account status information for existing customers) and to obtain new virtual network address information (e.g., domain names and virtual IP addresses) for new customers.

Those skilled in the art will also appreciate that, while various components are illustrated as being in memory or on storage, these items or portions of them can be transferred between memory and other storage for purposes of memory management and data integrity. The software components and data structures may also be stored as instructions on a computer-readable medium (e.g., a hard disk, a memory, or a portable article to be read by an appropriate drive), and transmitted as generated data signals on a variety of computer-readable transmission mediums, including wireless-based and wired/cable-based mediums. Accordingly, the present invention may be practiced with other computer system configurations.

Moreover, those skilled in the art will appreciate that the software facility can be used in various environments other than the Internet. In addition, a hosting computer system may comprise any combination of hardware or software that can provide hosting functionality. Similarly, a customer system may comprise any combination of hardware or software that can interact with the hosting computer system. These systems may include television-based systems or various other consumer products. The various computer systems can also operate on a wide variety of operating system types (e.g., Windows, Linux, Unix, MacOS, BEOS, PalmOS, EPOC, Windows CE, FLEXOS, OS/9, JavaOS, etc.), and need not share the same operating system.

Figures 2A, 2B:
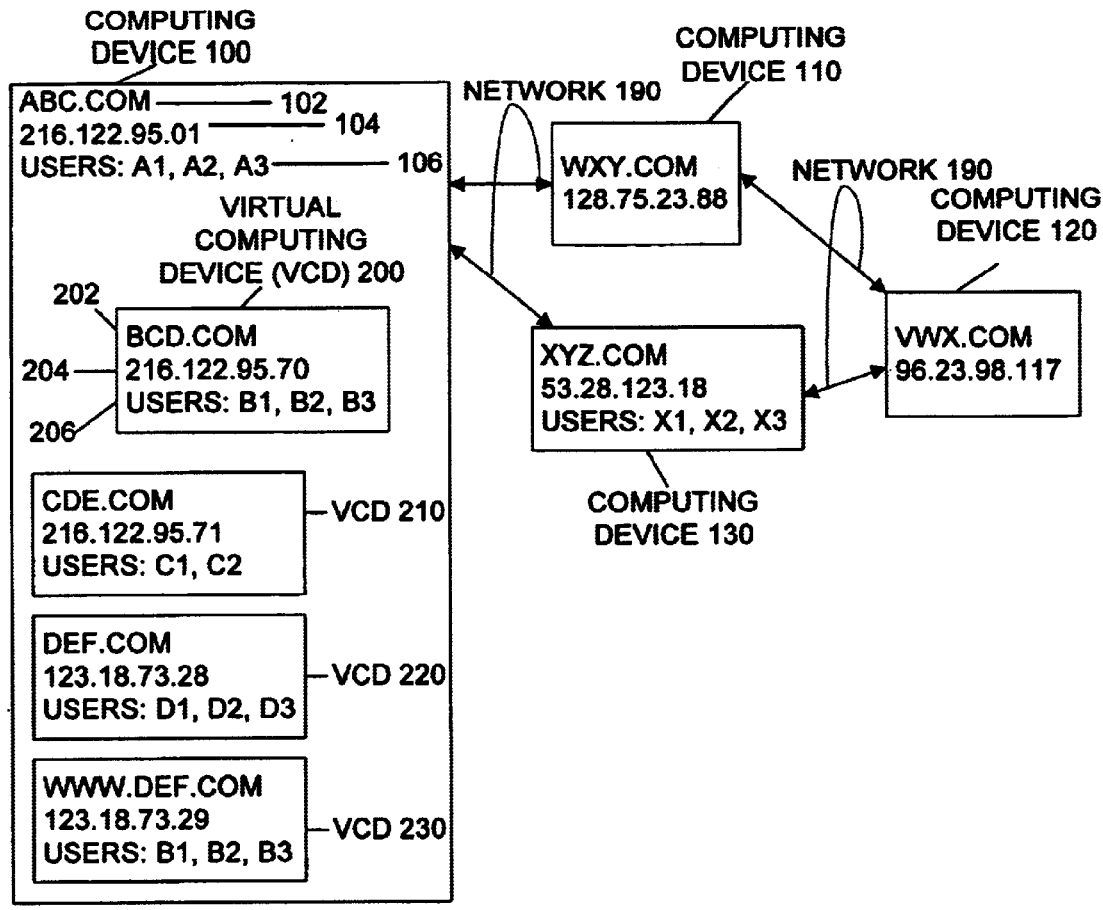

FIGS. 3A and 3B illustrate using the software facility to perform the same transmission of an email message as was previously discussed with respect to FIGS. 2A-2E, that being from virtual user b1 of VCD 200 to user x1 of computing device 130. In this example, computing device 100 illustrated in FIG. 2A is a virtual hosting computer system 400 as illustrated in FIG. 4, with the virtual bcd.com domain corresponding to VCD 200 being one of the virtual domains 440, and remote computing device 130 in FIG. 2A is one of the server computers 470 illustrated in FIG. 4. Thus, the email to be sent is created by user b1 of virtual domain bcd.com using a mail/user storage agent 442 available on the hosting computer system, and is then temporarily stored in the outgoing mail queue 444 for the bcd.com virtual domain. A Sendmail program modified to act as a VDMTA is executing on the hosting computer system to retrieve the email from virtual domain bcd.com's outgoing mail queue 444 (as well as any other email present in the queue), use the virtual network address information for the bcd.com domain to establish connections with remote computing device 130 on behalf of the bcd.com virtual domain, and then transmit the email to the remote computing device.

FIG. 3A illustrates the email as it is modified by the remote Sendmail program executing on remote computing device 130. In particular, the remote Sendmail program adds a header line 347 to the email that indicates information about the identity of the email sender. However, with the techniques of the software facility used by the local VDMTA Sendmail program, the remote Sendmail program receives the virtual network address information for virtual domain bcd.com rather than the network address information for computing device 100. As a result, the remote server Sendmail identifies the domain name and IP address of the sending computing device to be that of VCD 200 (i.e., "bcd.com" and "216.122.95.70") in line 347, as is illustrated in bold for the sake of clarity. In a similar manner, the communication that occurs between the two executing Sendmail programs reflects the virtual network address information, as illustrated in FIG. 3B. In particular, as shown in line 361, the client VDMTA Sendmail provides its domain name as "bcd.com". Since the remote server Sendmail believes the actual domain name of the client to be "bcd.com", line 362 (illustrated in bold for the sake of clarity) indicates that it believes the remote device to be "bcd.com" (since no other identification information is added in parentheses). In addition, the server Sendmail on computing device 130 does not add an entry to an Error file since it did not detect any errors.

Those skilled in the art will appreciate that an existing mail transport agent can be modified to act as a VDMTA in a variety of ways, and that the modifications will be specific to the particular mail transport agent used. Tables 1–4 below illustrate examples of modifications that can be made to a Sendmail version 8.9.3 program so that it acts as a VDMTA.

In particular, Table 1 illustrates C-language instructions that the modified client Sendmail can execute before making a connection with a remote server Sendmail so that the modified client Sendmail will use appropriate virtual network address information in place of the actual network address information for the computing device on which the modified client Sendmail is executing. These instructions can be added, for example, in the "makeconnection" procedure in the daemon.c file after the "socket( )" system call and before the "connect( )" system call.

TABLE 1

```
{
register struct hostent *hp;
struct sockaddr_in psa;
char *vhost, vhostaddr[50];
bzero((char *)&psa, sizeof(struct sockaddr_in));
psa.sin_family=AF_INET;
vhost = macvalue ('j', e);
hp = sm_gethostbyname(vhost);
if (hp == NULL)
    syserr("544 host \"%s\" unknown", vhost);
else {
    strcpy(vhostaddr, inet_ntoa(*(struct in_addr *)hp->h_addr));
    psa.sin_addr.s_addr = inet_addr(vhostaddr);
/*    bcopy(hp->h_addr, &DaemonAddr.sin.sin_addr,INADDRSZ);
*/
}
psa.sin_port=htons(INADDR_ANY);
if (bind(s, (struct sockaddr *)&psa, sizeof(struct sockaddr_in)) <0 {
    printf("Error binding. \n");
}
}
```

Table 2 illustrates C-language instructions that the modified client Sendmail can execute so that created emails are stored in an outgoing mail queue for the appropriate virtual domain or machine before they are transmitted. These instructions can be added, for example, in the "main" procedure in the main.c file after the uid and gid are determined and before "save command line arguments" and the reading of the configuration files.

TABLE 2

```
{
#define VIRTUAL_UIDMIN 1000
#define VIRTUAL_UIDMAX 30000
    structpasswd *pp;
    login_cap_t *lcptr;
    if ((RealUid!=0) && (geteuid() == 0) &&
    (Real Uid >= VIRTUAL_UIDMIN) && (RealUid <=
    VIRTUAL_UIDMAX))
    {
        /* the command is invoked from a user that controls a
         * virtual domain, as a setuid binary. Do chroot to
         * the virtual domain. */
        pp = sm_getpwuid(ReadUid);
        lcptr = login_getclass(pp->pw_class);
        setusercontext(lcptr, pp, pp->pw_uid, LOGIN_SETRESOURCES);
        chroot(pp->pw_dir);
        chdir("/");
        setegid(pp->pw_gid);
        seteuid(pp->pw_uid);
        RunAsUid = RealUid;
        RunAsGid = RealGid;
    }
}
```

Table 3 illustrates a Perl-language script named "vsmq.pl" that when executed will process the queues of outgoing stored emails for the various virtual users. In the illustrated example, each virtual user X has a home directory at "/usr/home/X/" and has a outgoing mail queue at "/usr/ home/X/var/spool/mqueue". The script can be stored in any location from which it can be executed, such as "/usr/local/bin/" on some Unix-based computing devices.

TABLE 3

```
#l/usr/local/bin/perl
# Flush mail queue directory for each virtual domain.

$vsmcmd = '/usr/local/bin/virtual /bin/sendmail -q -v';
$conf = '/etc/ip.conf';
open IPCONF, $conf\\ die "Could not open $conf\n";
while (<IPCONF>) {
    chop;
    ($ip, $vuser) = split /s+/;
    if (defined $vusers) {
        $vusers = join '', $vusers, $vuser;
    } else {
        $vusers = $vuser;
    }
}
close (IPCONF);
#print "$vusers \n";
foreach $user (split//,$vusers) {
    $dir = "/usr/home/$user";
    $qdir = "${dir}/var/spool/mqueue";
    if ((-d $qdir) and (-e <${qdir}/qf*>)){
#       print "$qdir \n";
        system ('/usr/bin/su',$user,'-c',$vsmcmd);
    }
}
```

Finally, the following line can be added to the Unix root user's crontab so that the script illustrated in Table 3 will be automatically executed.

40****/usr/local/bin/vsmq.pl>>\&/var/log/maillog

Those skilled in the art will appreciate that the locations of the files may vary on different computing devices and with different operating systems.

Figure 5:
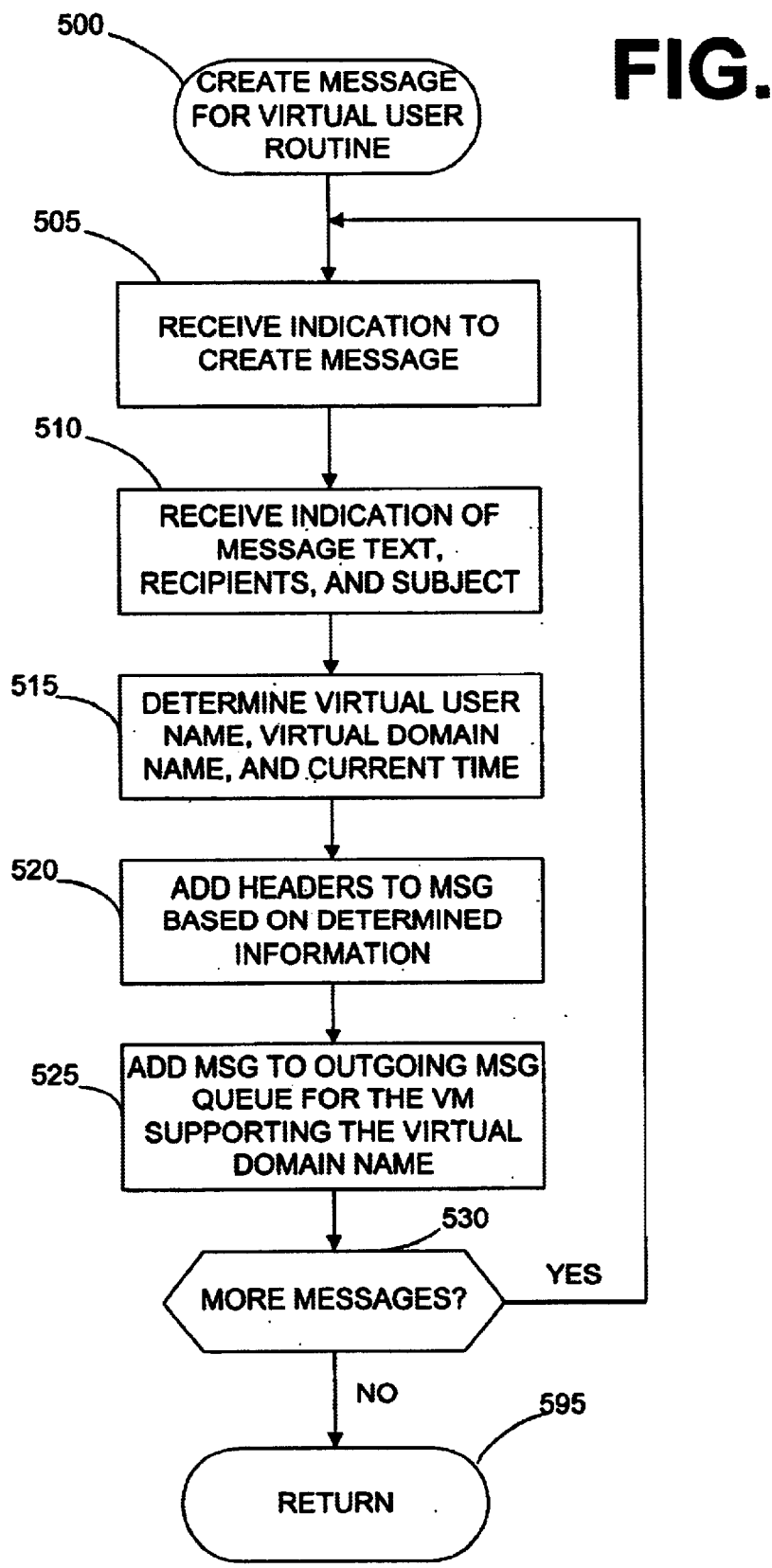
FIG. 5 is a flow diagram of an embodiment of the Create/Store Message For Virtual User routine.

FIG. 5 is a flow diagram of an embodiment of the Create/Store Message For Virtual User routine 500. The routine creates email messages for a virtual user of a hosted virtual domain, and stores the created email messages in the outgoing message mail queue for the virtual domain for later transmittal. Those skilled in the art will appreciate that in other embodiments an email creation routine may provide a created email to a separate routine for storage in the outgoing mail queue (e.g., a mail transport agent), or that in other embodiments the email creation routine may invoke a mail transport agent (e.g., periodically or after the creation of some or all email messages) to transmit created messages.

The routine begins in step 505 where an indication to create a message is received. The routine continues to step 510 where it receives an indication of the contents of the message, of the message recipients, and optionally of other message-related information such as a message Subject. In step 515 the routine then determines the virtual user name of the sender, the virtual network address information of the virtual user's domain, and the current time. The determined information is used in step 520 to add various headers to the created message. In step 525, the created message is added to the outgoing message queue for the virtual domain (or the virtual computer system supporting the virtual domain). In step 530, it is determined whether there are more messages to be created and stored, and if so returns to step 505. If not, the routine continues to step 595 and ends.

Figure 6A:
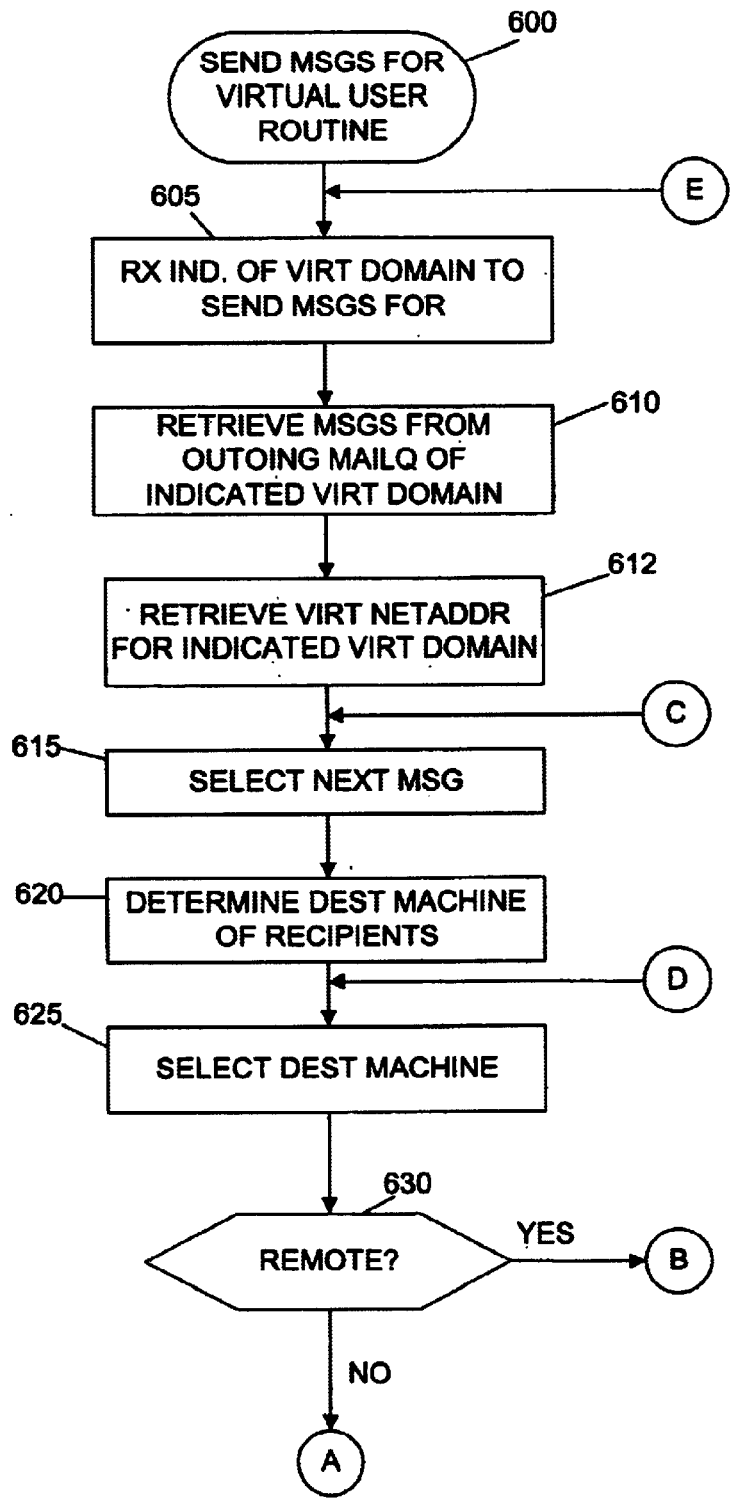
FIGS. 6A and 6B are a flow diagram of an embodiment of the Send Messages For Virtual User routine.
Figure 6B:
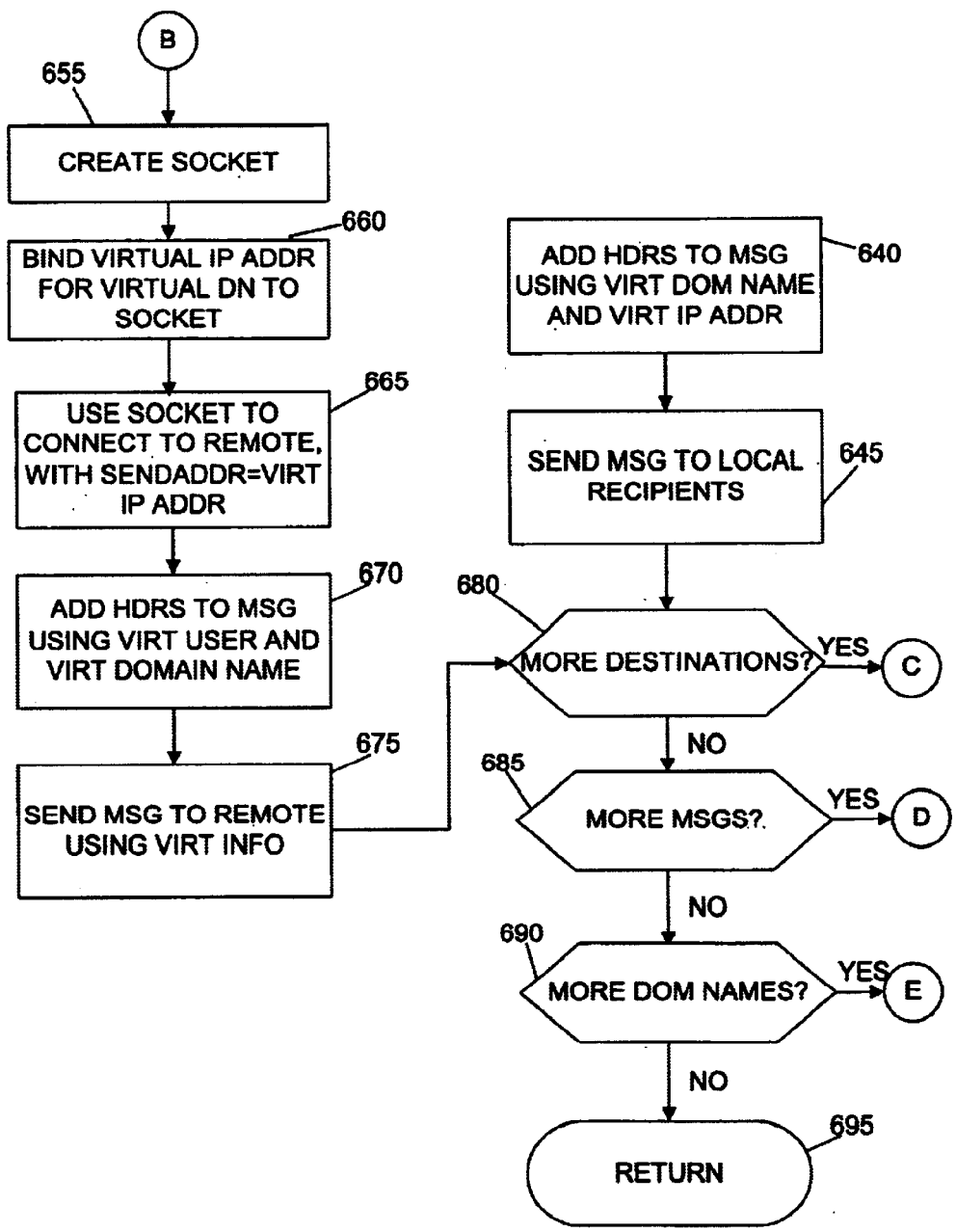

FIGS. 6A and 6B are a flow diagram of an embodiment of the Send Messages For Virtual User routine 600. The routine retrieves the messages stored in the outgoing mail queue of a virtual domain, and sends the messages to the appropriate remote computing devices using the virtual network address information of the virtual domain. The routine begins in step 605 where it receives an indication of a virtual domain whose queued outgoing messages are to be sent. The routine continues to step 610 where it retrieves the queued outgoing messages for the indicated virtual domain, and then continues to step 612 to retrieve the virtual network address information for the indicated virtual domain. The routine continues to step 615 to select the next of the retrieved messages, beginning with the first. In step 620, the routine then determines the destination computing devices of the message (e.g., from the message headers), and continues to step 625 to select the next destination device, beginning with the first. In step 630, the routine then determines if the selected computing device is a remote device.

If it is determined that the selected computing device is not remote, then at least one of the recipients of the message is a virtual user of the same virtual domain as that of the message sender, and the routine continues to step 640. In step 640, the routine optionally adds headers to the message using the virtual network address information of the virtual domain (e.g., to add mandatory headers not included by the mail creation agent). In step 645, the routine then sends the message to the local recipients (e.g., by adding a copy of the message to incoming mail queues for each of the recipients).

If it was instead determined that the selected computing device is remote, then the routine continues to step 655 to create a communication socket to be used for transmitting the email to the selected computing device. The routine then continues to step 660 to bind the virtual network address information (e.g., a virtual IP address) to the socket. In step 665, the routine then uses the socket to make a connection to the IP address of the remote machine (which can be obtained from the email message or from the domain name of the remote device that is included in the email message), using the virtual network address information as the address of the sender. The routine then continues to step 670 to optionally add headers to the message using the virtual network address information of the virtual domain, and then sends the message to the remote recipients over the socket.

After steps 645 or 675, the routine continues to step 680 to determine if there are more destination machines for the selected email message. If so, the routine returns to step 625, and if not continues to step 685 to determines if there are more messages from the queue to be sent. If so, the routine returns to step 615, and if not the routine continues to step 690 to determine if there are more virtual domains whose messages are to be sent. If so, the routine returns to step 605, and if not the routine continues to step 695 and ends.

Those skilled in the art will also appreciate that in some embodiments the functionality provided by the routines discussed above may be provided in alternate ways, such as being split among more routines or consolidated into less routines. Similarly, in some embodiments illustrated routines may provide more or less functionality than is described, such as when other illustrated routines instead lack or include such functionality respectively, or when the amount of functionality that is provided is altered.

From the foregoing it will be appreciated that, although specific embodiments have been described herein for purposes of illustration, various modifications may be made without deviating from the spirit and scope of the invention. Accordingly, the invention is not limited except as by the appended claims. In addition, while certain aspects of the invention are presented below in certain claim forms, the inventors contemplate the various aspects of the invention in any available claim form. For example, while only one some aspects of the invention may currently be recited as being embodied in a computer-readable medium, other aspects may likewise be so embodied. Accordingly, the inventors reserve the right to add additional claims after filing the application to pursue such additional claim forms for other aspects of the invention.

We claim:

1. A method in a computer system acting as a host of multiple virtual computer systems for communicating with remote computer systems on behalf of the virtual computer systems, the virtual, remote, and host computer systems each having a unique network address, the communicating on behalf of a virtual computer system performed by using the virtual computer system network address in place of the host computer system network address, the method comprising:

communicating with a first remote computer system on behalf of the host computer system by creating a first communication socket on the host computer system whose destination is the network address of the first remote computer system;

during establishment of a connection with the first remote computer system using the first communication socket, responding to a query for a source network address for the first communication socket by determining and providing the network address of the host computer system; and sending a message to the first remote computer system from the host computer system by using the first communication socket, the sent message including the source network address of the host computer system; and for each of multiple of the virtual computer systems, communicating with a second remote computer system on behalf of that virtual computer system by determining that a message is to be sent from that virtual computer system to the second remote computer system;

creating a communication socket on the host computer system whose destination is the network address of the second remote computer system;

before using the created communication socket to establish a connection with the second remote computer system, binding the network address of that virtual computer system to be a source of the created communication socket; and sending a message to the second remote computer system from the host computer system on behalf of that virtual computer system by using the created communication socket, the sent message including the bound source network address of the virtual computer system, so that the second remote computer system receives communication over the host computer system communication socket as if the host computer system were that virtual computer system.

2. The method of claim 1 including, under control of the second remote computer system:

for each of the multiple virtual computer systems, receiving the sent message from the host computer system on behalf of the virtual computer system;

determining the source network address of the sent message to be the sent network address of the virtual computer system; and adding information to the received message indicating that the message was received from the virtual computer system.

3. The method of claim 1 including, under control of the first remote computer system:

receiving the sent message from the host computer system;

determining the source network address of the sent message to be the sent network address of the host computer system; and adding information to the received message indicating that the message was received from the host computer system.

4. The method of claim 1 wherein the sent messages are emails.

5. The method of claim 4 wherein the sending of the emails is performed by an executing copy of Sendmail.

6. The method of claim 1 wherein the unique network address for each of the virtual, remote, and host computer systems is an Internet Protocol address.

7. The method of claim 1 wherein the unique network address for each of the virtual, remote, and host computer systems is a Domain Name System domain name.

8. The method of claim 1 wherein the hosted virtual computer systems share memory, storage and processing of the host computer system.

9. The method of claim 1 wherein the determining that a message is to be sent from a virtual computer system to the second remote computer system includes:

receiving an indication from a remote user to access resources of the virtual computer system;

after determining that the remote user is a defined user of the virtual computer system, providing access to the resources;

receiving an indication from the remote user to create a message having a recipient that is a user of the second remote computer system; and creating the message from the defined user of the virtual computer system with the user of the second remote computer system as a recipient, and wherein the message sent to the second remote computer system from the host computer system on behalf of the virtual computer system is the created message.

10. The method of claim 9 including, after the creating of the message and before the sending of the message, storing the created message temporarily in a queue of outgoing messages for the virtual computer system.

11. The method of claim 1 wherein the query for the source network address for the first communication socket is made by an operating system of the host computer system.

12. A method in a computing device having an assigned network address and having multiple distinct associated virtual network addresses, the method for communicating with remote computing devices using one of the virtual network addresses in place of the assigned network address, the method comprising:

for each of multiple of the virtual network addresses, communicating with a remote computing device having a specified network address by creating a communication socket whose destination is the specified network address;

before using the created communication socket to send information to the remote computing device, binding the virtual network address to the created communication socket so as to be a source network address for the created communication socket; and sending information to the remote computing device using the created communication socket, the sent information including the bound source virtual network address, so that the remote computing device receives communications over the communication socket as if the computing device were assigned the virtual network address.

13. The method of claim 12 including:
creating a first communication socket whose destination is a network address of a first remote computing device; and
without binding a virtual network address to the first communication socket, sending information to the first remote computing device using the first communication socket such that the sent information includes the assigned network address.

14. The method of claim 13 including, under control of the first remote computing device:
receiving the information sent from the computing device using the first communication socket; and
determining a source of the sent information to be the assigned network address of the computing device.

15. The method of claim 12 including, under control of one of the remote computing devices to which information was sent using a created communications socket having a bound source virtual network address:
receiving the information sent from the computing device; and
determining a source of the sent information to be the virtual network address bound to the created communication socket.

16. The method of claim 12 wherein the virtual network addresses are IP addresses.

17. The method of claim 12 wherein the virtual network addresses are domain names.

18. The method of claim 12 wherein the virtual network addresses are hosted by the computing device as a service to customers.

19. The method of claim 12 wherein the communicating with a remote computing device having a specified network address for a first virtual network address includes, before the creating of the communication socket:
receiving an indication from a user associated with the first virtual network address to create a message having a recipient that is a user of the remote computing device; and
creating the message with the virtual user as a sender, with the user of the remote computing device as a recipient, and with the virtual network address included in the message,
and wherein the created message is the information sent to the remote computing device using the created communication socket.

20. The method of claim 19 including, after the creating of the message and before the sending of the message, storing the created message temporarily in a queue of outgoing messages associated with the virtual network address.

21. The method of claim 12 wherein the sending of information to a remote computing device using a created communication socket includes:
making a connection request to the remote computing device over the created communication socket, the connection request including an indication of the virtual network address; and
receiving an indication from the remote computing device that the connection is accepted.

22. The method of claim 12 including:
receiving an email sent from a remote computing device that is a host for a virtual network address, the remote computing device sending the email over a communication socket to which the virtual network address is bound; and
adding a Received header line to the received email indicating that the email was received from the virtual network address.

23. The method of claim 12 wherein the information sent to at least one of the remote computing devices is an email.

24. A computer-readable medium whose contents cause a computing device to communicate with a remote computing device, the computing device having an assigned network address and having multiple distinct associated virtual network addresses, the communicating using one of the virtual network addresses in place of the assigned network address by:
for at least one of the virtual network addresses, communicating with a remote computing device having a specified network address by creating a communication socket whose destination is the specified network address;
before using the created communication socket to send information to the remote computing device, binding the virtual network address to the created communication socket so as to be a source network address for the created communication socket; and
sending information to the remote computing device using the created communication socket, the sent information including the bound source virtual network address.

25. The computer-readable medium of claim 24 wherein the computer-readable medium is a memory of a computer system.

26. The computer-readable medium of claim 24 wherein the computer-readable medium is a data transmission medium transmitting a generated data signal containing the contents.

27. A computing device for communicating with a remote computing device, the computing device having an assigned network address and having multiple distinct associated virtual network addresses, comprising:
a first module capable of creating a communication socket whose destination is a specified network address of a remote computing device and of, before using the created communication socket to send information to the remote computing device, binding one of the virtual network addresses to the created communication socket so as to be a source network address for the created communication socket; and
a second module capable of sending information to the remote computing device using the created communication socket, the sent information including the bound source virtual network address.

28. The computing device of claim 27 wherein the first and second modules are executing in memory of the computing device.

29. A computing device for communicating with a remote computing device, the computing device having an assigned network address and having multiple distinct associated virtual network addresses, comprising:
means for creating a communication socket whose destination is a specified network address of a remote computing device;
means for, before using the created communication socket to send information to the remote computing device, binding one of the virtual network addresses to the created communication socket so as to be a source network address for the created communication socket; and means for sending information to the remote computing device using the created communication socket, the sent information including the bound source virtual network address.

30. A method for sending emails by a computing device that is a host for multiple virtual domains that each have a distinct network identifier, the sending of the emails on behalf of users of the virtual domains by using the distinct network identifiers for the virtual domains in place of a network identifier for a non-virtual domain associated with the computing device, the method comprising:

for each of multiple of the virtual domains, sending an email from the virtual domain to a remote domain having a specified network identifier by creating a communication socket whose destination is the specified remote domain; before using the created communication socket to send the email to the remote domain, binding the distinct network identifier for the virtual domain as a source for the created communication socket, the binding such that information sent to the remote domain using the created communication socket will indicate the bound network identifier as a source of the sent information; and sending the email to the remote domain using the created communication socket.

31. The method of claim 30 including, under control of one of the remote domains to which an email was sent using a created communications socket having a bound source network identifier for a virtual domain:

receiving the email sent from the host computing device; and adding a Received header line to the received email indicating that the email was received from the virtual domain.

32. The method of claim 30 including, for each of the multiple virtual domains, retrieving the email to be sent from a queue of outgoing messages associated with the virtual domain.

33. The method of claim 30 including:

creating a first communication socket whose destination is a network address of a first remote domain; and without binding a network identifier for a virtual domain to the first communication socket, sending information to the first remote domain using the first communication socket such that the sent information includes the network identifier for the non-virtual domain associated with the host computing device.

34. A computer-readable medium containing instructions that when executed cause a computing device to send an email to a remote domain on behalf of a user of a first virtual domain, the first virtual domain being one of multiple virtual domains that are hosted by the computing device and that each have a distinct network identifier, the sending of the email using the distinct network identifier for the first virtual domains in place of a network identifier for a non-virtual domain associated with the computing device, by:

creating a communication socket whose destination is the remote domain;

before using the created communication socket to send the email to the remote domain, binding the distinct network identifier for the first virtual domain as a source for the created communication socket, the binding such that information sent to the remote domain using the created communication socket will indicate the bound network identifier as a source of the sent information; and sending the email to the remote domain using the created communication socket.

35. A computing device for sending an email to a remote domain on behalf of a user of a first virtual domain, the computing device hosting multiple virtual domains including the first virtual domain, each virtual domain having a distinct network identifier, comprising:

a first module capable of creating a communication socket whose destination is the specified remote domain and of, before using the created communication socket to send the email to the remote domain, binding the distinct network identifier for the first virtual domain as a source for the created communication socket, the binding such that information sent to the remote domain using the created communication socket will indicate the bound network identifier as a source of the sent information; and a second module capable of sending the email to the remote domain using the created communication socket.

36. A method for sending messages by a computing device that is a host for multiple virtual users, the computing device having an assigned network address and each of the virtual users being associated with a virtual network address distinct from the assigned network address, the sending of a message for a virtual user performed by using the virtual network address associated with the virtual user in place of the assigned network address, the method comprising:

receiving a request from a user to send a message to a recipient on a remote computing device;

determining that the user is one of the virtual users;

retrieving the virtual network address associated with the one virtual user; and sending the message to the recipient on the remote computing device by binding the retrieved virtual network address to a communication mechanism to be used for the sending, the binding such that information sent using the created communication socket will indicate the bound virtual network address to be a source of the sent information; and sending the message to the remote computing device using the communication mechanism.

37. The method of claim 36 including, under control of the remote computing device:

receiving the message sent from the host computing device; and determining a source of the sent message to be the bound virtual network address.

38. The method of claim 36 including, before the receiving of the request from the user to send the message:

receiving an indication from the one virtual user to create the message; and creating the message with the one virtual user as a sender and with the virtual network address associated with the one virtual user included in the message.

39. The method of claim 38 including, after the creating of the message and before the sending of the message, storing the created message temporarily in a queue of outgoing messages associated with the virtual user.

40. A computer-readable medium whose contents cause a computing device to send messages for a virtual user of the computing device, the computing device having an assigned network address and being a host for multiple virtual users, each of the virtual users being associated with a virtual network address distinct from the assigned network address, by:

receiving a request from a user to send a message to a recipient on a remote computing device;

determining that the user is one of the virtual users;

retrieving the virtual network address associated with the one virtual user; and sending the message to the recipient on the remote computing device by binding the retrieved virtual network address to a communication mechanism to be used for the sending, the binding such that information sent using the created communication socket will indicate the bound virtual network address to be a source of the sent information; and sending the message to the remote computing device using the communication mechanism.

41. A computing device for sending messages on behalf of a virtual user, the computing device having an assigned network address and being a host for multiple virtual users, each of the virtual users being associated with a virtual network address distinct from the assigned network address, comprising:

a first module capable of receiving a request from a user to send a message to a recipient on a remote computing device and of determining that the user is one of the virtual users; and a second module capable of retrieving the virtual network address associated with the one virtual user and of sending the message to the recipient on the remote computing device by binding the retrieved virtual network address to a communication mechanism to be used for the sending such that information sent using the created communication socket will indicate the bound virtual network address to be a source of the sent information and by sending the message to the remote computing device using the communication mechanism.

\* \* \* \* \*